O. G. RIESKE.
SEED DRILL.
APPLICATION FILED MAR. 17, 1915.
1,179,865.
Patented Apr. 18, 1916.
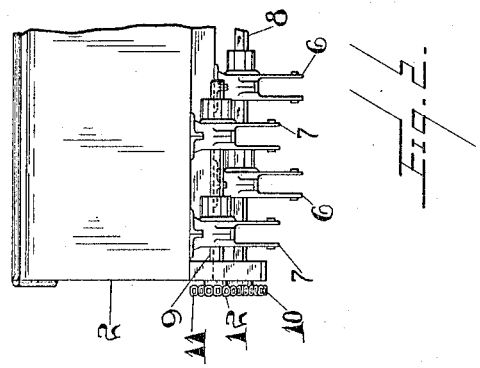
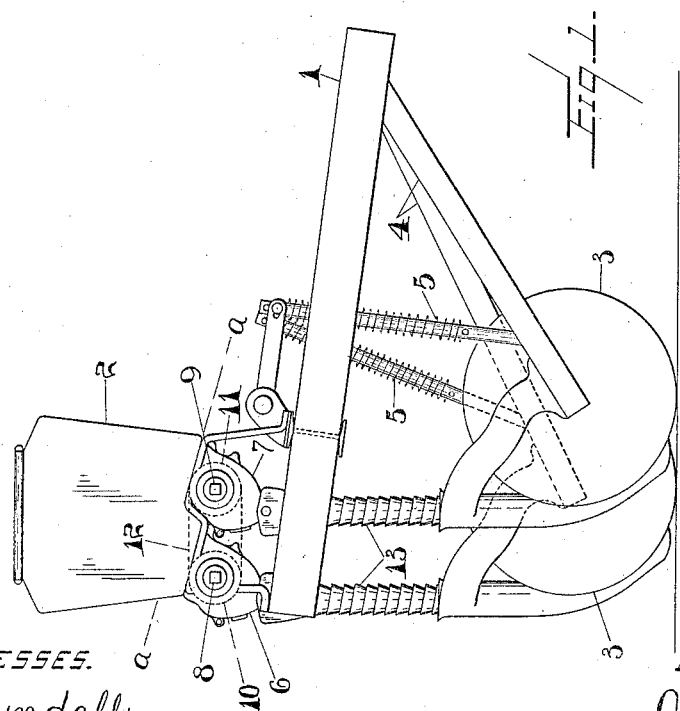

UNITED STATES PATENT OFFICE.

OTTO GEORGE RIESKE, OF TORONTO, ONTARIO, CANADA, ASSIGNOR TO MASSEY-HARRIS COMPANY, LIMITED, OF TORONTO, ONTARIO, CANADA.

SEED-DRILL.

1,179,865. Specification of Letters Patent. Patented Apr. 18, 1916.

Application filed March 17, 1915. Serial No. 15,121.

*To all whom it may concern:*

Be it known that I, OTTO G. RIESKE, of the city of Toronto, in the county of York, Province of Ontario, Canada, a subject of the King of Great Britain, have invented certain new and useful Improvements in Seed-Drills, of which the following is a specification.

This invention relates to seed drills in which a series of seed distributers are located at the bottom of a seed box and feed the seed to the grain tubes which guide the seed to the drills formed by the hoes, shoes or disks with which the machine is provided. In such drills it has not been found possible to sow in rows or drills less than six inches apart owing to the inevitable limitation of the possible reduction of width of the seed distributers. A demand exists for narrower spacing of the drills and the present invention is intended to fill the want. This object is attained by providing the seed box with two series of seed distributers arranged the one behind the other, and each provided with a distributer shaft, the distributers on one shaft being in staggered relationship to those on the other. This enables me to set the seed distributers so that the present minimum spacing of the drills, about six inches, may be substantially cut in half, that is, reduced to nearly three inches if desired, as the staggering of the seed distributers enables the usual staggering of the drill forming devices to be materially increased so that they also may be set to operate much closer together than would otherwise be possible.

The invention is illustrated in the accompanying drawings in which—

Figure 1 is a side elevation of part of a seed drill constructed in accordance with my invention; and Fig. 2 a front elevation of the seed box and distributers looking in the direction of the dotted line *a—a* in Fig. 1.

In the drawings like numerals of reference indicate corresponding parts in the different figures.

Referring particularly to Fig. 1, 1 represents the frame of the drill on which the seed box 2 is supported in the usual manner. On this frame the drill-forming devices are connected in the ordinary manner. While these may be of any type, I illustrate ordinary disk drills 3, of which 4 are the drag bars. Spring pressure devices 5 of ordinary construction are employed, suitably connected with the frame and drag bars.

The seed box is formed with a centrally stepped bottom, the bottom at each side of the step forming two flats each sloping downwardly and forwardly as shown. To each half of the bottom is applied a series of seed distributers, the two series being numbered 6 and 7 respectively. Each series is provided with a distributer shaft, these being numbered 8 and 9 respectively. These distributer shafts are geared together so that they rotate in the same direction. Preferably sprocket gearing is employed, the distributer shaft 8 being provided with the sprocket wheel 10 and the distributer shaft 9 with the sprocket wheel 11, the sprocket wheels being connected by the sprocket chain 12. Any suitable means may be provided for driving one of the distributer shafts, whereby both will be simultaneously driven.

On each seed distributer is hung a grain tube 13 of any ordinary construction. The distributers on the two shafts are set in staggered relationship to one another, whereby the alternating distributers may be set much closer together than would otherwise be possible. The stepped construction of the bottom of the seed box enables the seed to be fed in equal proportion to each series of distributers, so that an equal distribution of seed to each drill may be effected.

From the above description it will be seen that I have devised a seed drill which will satisfactorily attain the objects of my invention as set out in the preamble to this specification.

What I claim as my invention is:—

In a seed drill, the combination of a seed box having a centrally stepped bottom forming two flats inclined to the horizontal one in front and one behind the step; and two series of distributers connected to the bottom of the seed box, one series in front of and one behind the step, both series being adapted to discharge toward the rear of the machine.

Signed at Toronto, Canada, this 11th day of March, 1915, in the presence of the two undersigned witnesses.

OTTO GEORGE RIESKE.

Witnesses:
 CHARLES MacLEOD,
 WILLIAM PEACE.

Copies of this patent may be obtained for five cents each, by addressing the "Commissioner of Patents, Washington, D. C."